US007715424B2

(12) United States Patent
Venkataswami et al.

(10) Patent No.: US 7,715,424 B2
(45) Date of Patent: May 11, 2010

(54) METHOD AND SYSTEM FOR BILLING NETWORK USAGE IN A NETWORK

(75) Inventors: Balaji Venkat Venkataswami, Chennai (IN); Ganesan Velrajan, Chennai (IN); Srinivasan Santhanam, Chennai (IN); Srinivasa Reddy Kovvuri, Chennai (IN)

(73) Assignee: Cisco Technology, Inc., San Jose, CA (US)

( * ) Notice: Subject to any disclaimer, the term of this patent is extended or adjusted under 35 U.S.C. 154(b) by 917 days.

(21) Appl. No.: 11/496,174

(22) Filed: Jul. 31, 2006

(65) Prior Publication Data

US 2008/0025303 A1    Jan. 31, 2008

(51) Int. Cl.
*H04L 12/56*    (2006.01)
*H04J 1/16*    (2006.01)
(52) U.S. Cl. .................. 370/432; 370/252; 370/390; 370/487
(58) Field of Classification Search ................. 370/252, 370/352–356, 400, 401, 390, 432, 487
See application file for complete search history.

(56) References Cited

U.S. PATENT DOCUMENTS 6,754,181 B1 * 6/2004 Elliott et al. ................ 370/252

2002/0013897 A1 * 1/2002 McTernan et al. ........... 713/153

OTHER PUBLICATIONS

Kieran Mc Donald, Alan F. Smeaton, Seán Marlow, Noel Murphy, Noel E. O'Connor, Online Television Library: Organisation and Content Browsing for General Users, SPIE Electronic Imaging—Storage and Retrieval for Media Databases 2001.San Jose, CA, Jan. 24-26, 2001 found at http://www.computing.dcu.ie/~kmcdon/.
Bill Fenner, Mark Handley, Hugh Holbrook and Isidor Kouvelas; Protocol Independent Multicast—Sparse Mode (PIM-SM):, Oct. 2004 found at http://www3.ietf.org/proceedings/05nov/IDs/draft-ietf-pim-sm-v2-new-11.txt.
Introduction to Cisco IOS® Flexible NetFlow, Cisco Systems, Inc., Copyright 1992-2006, found at http://www.cisco.com/en/US/products/ps6601/prod_white_papers_list.html.

* cited by examiner

*Primary Examiner*—John Pezzlo
(74) *Attorney, Agent, or Firm*—Trellis IP Law Group, PC

(57) ABSTRACT

Methods, systems and apparatus for billing network usage in a network are provided. Statistics of subscribers' network usage and subscriber information are transmitted from a plurality of First Hop Multicast Routers (FHMRs) to a Net Flow Collection Server (NFCS). The NFCS consolidates the statistics received and subscriber information into a report. Thereafter, a Billing Module (BM) prepares subscribers billing information based on the report and policies configured on the BM. Advantageously, subscribers are charged based on their individual network usage.

22 Claims, 7 Drawing Sheets

METHOD AND SYSTEM FOR BILLING NETWORK USAGE IN A NETWORK

BACKGROUND OF THE PRESENT INVENTION

1. Field of the Present Invention

Embodiments of the present invention relate, in general, to networking. More specifically, the embodiments of the present invention relate to a method and a system for billing network usage in a multicast content-delivery network.

2. Description of the Background Art

In a typical content-delivery network, sources transmit streaming content, such as a television channel instance, to selected multiple subscribers who have joined a multicast group. Each source has to generate only a single data stream and a multicast-enabled router forwards a multicast stream to a particular network only if there are multicast receivers on that network.

Membership in a multicast group is dynamic; hosts can join and leave at any time. There is no restriction on the location or number of members in a multicast group. A host can be a member of more than one multicast group at a time. How active a multicast group is and what members it has can vary from group to group and from time to time. A multicast group can be active for a long time, or it may be very short-lived. Membership in a group can change constantly. A group that has members may have no activity.

Routers executing a multicast routing protocol, such as Protocol-Independent Multicast (PIM), maintain forwarding tables to forward multicast datagrams. Routers use the Internet Group Management Protocol (IGMP) to learn whether members of a group are present on their directly attached subnets. Hosts join multicast groups by sending IGMP report messages.

Many multimedia applications involve multiple participants. IP multicast is naturally suitable for this communication paradigm. In order to show interest in receiving the content, the users transmit multicast-group join messages to the edge sites. For example, in a television network, television channels are streams of data. These channels are transmitted from various sources to a large number of subscribers through various service providers. The subscribers can switch between the various channels as desired.

To join a multicast, the subscriber transmits a multicast group join message to the multicast router operated by a service provider. The join message includes a control packet such as an IGMP join message. Subsequently, the router transmits a control packet such as a PIM join message to a Rendezvous Point (RP) router in the content-delivery network. All routers along the way to the RP transmit the PIM join message to their respective next-hop routers in the direction of the RP. In this way, multicast state is created on each router from the router closest to the subscriber to the RP. Thereafter, the RP router transmits the PIM join message to the source of the multicast stream. In this way, a multicast distribution tree is set up after which the subscriber is able to receive the multicast stream.

Setting up the multicast distribution tree requires processing the control packet, a process that can involves a considerable amount of time. Thus, there is often substantial latency for the subscriber to receive the transmission of the multicast.

When the subscriber switches from one multicast stream to another, a new multicast distribution tree must be set up. For each multicast stream, state must be maintained and routers sitting in the path from the source of the multicast stream to the subscriber must process the control packets.

If the subscriber switches between a number of multicast streams within a time window, then the control packet processing would also have to scale to match the number of multicast streams subscribed to by the subscriber within the time window. This leads to a substantial amount of additional processing by the routers in the multicast distribution tree. Additional bandwidth may need to be allocated if the selected multicast stream is not already in the set of multicast streams.

Conventionally, service providers bill subscribers on a fixed-rate basis. For example, a fixed monthly charge for a set of multicast streams is billed to the subscribers. Therefore, a subscriber who is frequently switching multicast streams is charged equal to a subscriber switching less frequently. Moreover, a subscriber subscribing to a multicast stream with heavy bandwidth requirement is charged equal to a subscriber subscribing to multicast streams with low bandwidth requirement. What is needed is a method and a system for monitoring and billing multicast stream subscribers based on various differential billing policies.

DETAILED DESCRIPTION OF EMBODIMENTS OF THE INVENTION

Embodiments of the present invention provide methods, systems, and machine-readable media for billing network usage in a network. In the description herein for embodiments of the present invention, numerous specific details are provided, such as examples of components and/or methods, to provide a thorough understanding of embodiments of the present invention. One skilled in the relevant art will recognize, however, that an embodiment of the present invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In a typical multicast network, multicast streams are transmitted from various sources to various subscribers. There can be a plurality of sources that transmit various multicast streams to subscribers associated with them. Embodiments of the present invention provide a method that enables billing of subscribers in a multicast network on the basis of their usage. A Net Flow Collection Server (NFCS) receives statistics pertaining to the subscribers' network usage. The NFCS is a server configured to receive information about traffic flow in the multicast network. The NFCS receives this information from a plurality of network infrastructure devices that are one hop away from the subscribers. The network infrastructure devices are configured to provide user information and statistics about the network usage of subscribers associated with them. The NFCS consolidates the information and the statistics into a consolidated report. Subsequently, a Billing Module (BM) uses the consolidated report to prepare billing information, which may include charges, levied to the subscribers, based on network usage.

Figure 1:
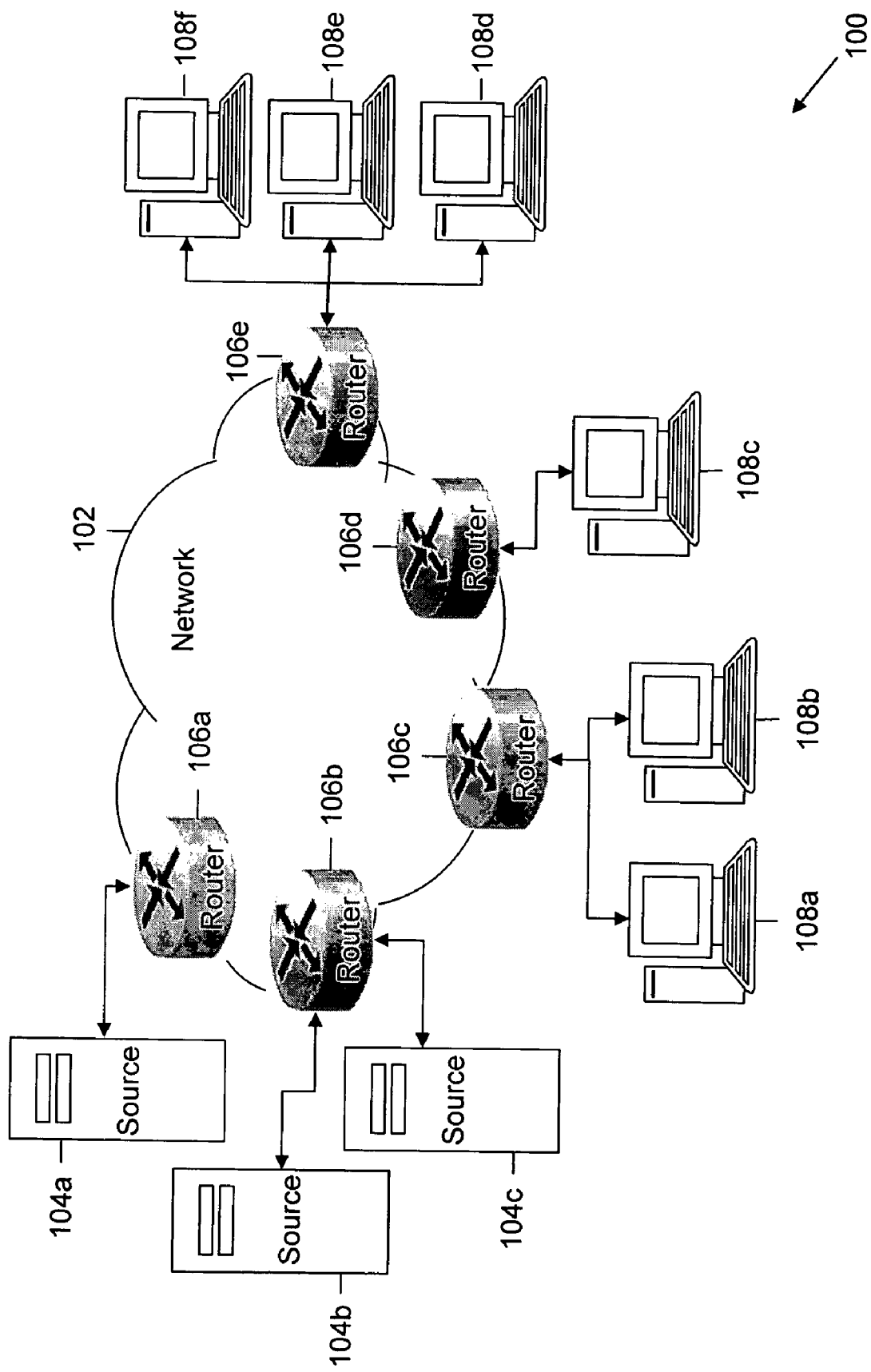
FIG. 1 illustrates a typical network environment for implementing embodiments of the present invention.

Referring now to the drawings, particularly by their reference numbers, FIG. 1 illustrates network environment 100 for implementing embodiments of the present invention. Network environment 100 includes network 102, a plurality of sources designated as sources 104, a plurality of routers designated as routers 106, and a plurality of subscribers designated as subscribers 108. Network 102 can be a collection of individual networks, interconnected with each other and functioning as a single large network. Examples of network 102 include, but are not limited to, Local Area Networks (LANs), Wide Area Networks (WANs), Metropolitan Area Networks (MANs), and the Internet. Further, network 102 may be a wireless or wired network. Network 102 provides a communication medium for transmitting content from sources 104 to one or more subscribers 108. Further, sources 104 can be any part or region of network 102, such as network devices, processes, computers, servers, network management stations, network links or resources, controlled or owned domains, Universal Resource Locators (URLs), content-delivery sites, etc. Examples of subscribers 108 include, but are not limited to, computers, servers, and network management stations, Internet Protocol (IP)-enabled set top boxes for interfacing a television to the network and an IP enabled television.

A subscriber interested in receiving content provided in a particular multicast stream transmits a request to a router that is associated with the subscriber. Subsequently, the router transmits the request to the source of the multicast stream. The request is transmitted through various routers included in the path of the multicast distribution tree of the multicast stream. Once the request is received by the source, the subscriber is included in the multicast group of the multicast stream. Consequently, the multicast stream is multicast to the subscriber through a path in the multicast distribution tree.

Further, sources 104 can provide their multicast streams to various edge sites included in network 102. The edge sites can be Internet Service Providers (ISPs), web hosts, cable companies, and the like. The edge sites store content provided by sources 104 and provide the content when requested. For example, a subscriber makes a request for certain content to a router associated with it. Thereafter, the router transmits the request to an edge site located in its vicinity. Consequently, the edge site becomes the source of the multicast distribution tree set up to deliver the content to the subscriber. Subsequently, the edge site provides the requested content to the router. Finally, the router transmits the content to the subscriber.

In accordance with an embodiment of the present invention, network 102 is a multicast network, where sources 104 transmit multicast streams to subscribers 108. Subscribers 108 can have access to various contents provided by sources 104. Therefore, subscribers 108 subscribe to sources 104 for receiving contents they are interested in. For example, subscribers 108a, 108b, and 108c subscribe to a multicast stream provided by source 104a. Subsequently, source 104a transmits the multicast stream to router 106a, which then transmits the multicast stream to routers 106c and 106d through network 102. Thereafter, router 106c creates a copy of the multicast stream and transmits the multicast stream to subscribers 108a and 108b. Router 106d transmits the multicast stream to subscriber 108c. Examples of content in a multicast stream include, but are not limited to, data files, audio, video or other multimedia content.

One skilled in the art will appreciate that FIG. 1 is merely a representation of a simplified network for the purpose of illustrating the present embodiment and the present invention is not to be limited by the number of illustrated sources, routers and subscribers. It is to be understood that the specific designation of sources 104, routers 106 and subscribers 108 is for the convenience of the reader and is not to be construed as limiting network environment 100 to a specific number of sources 104, routers 106 and subscribers 108 or to specific types of sources 104, routers 106 and subscribers 108 present in network environment 100.

Figure 2:
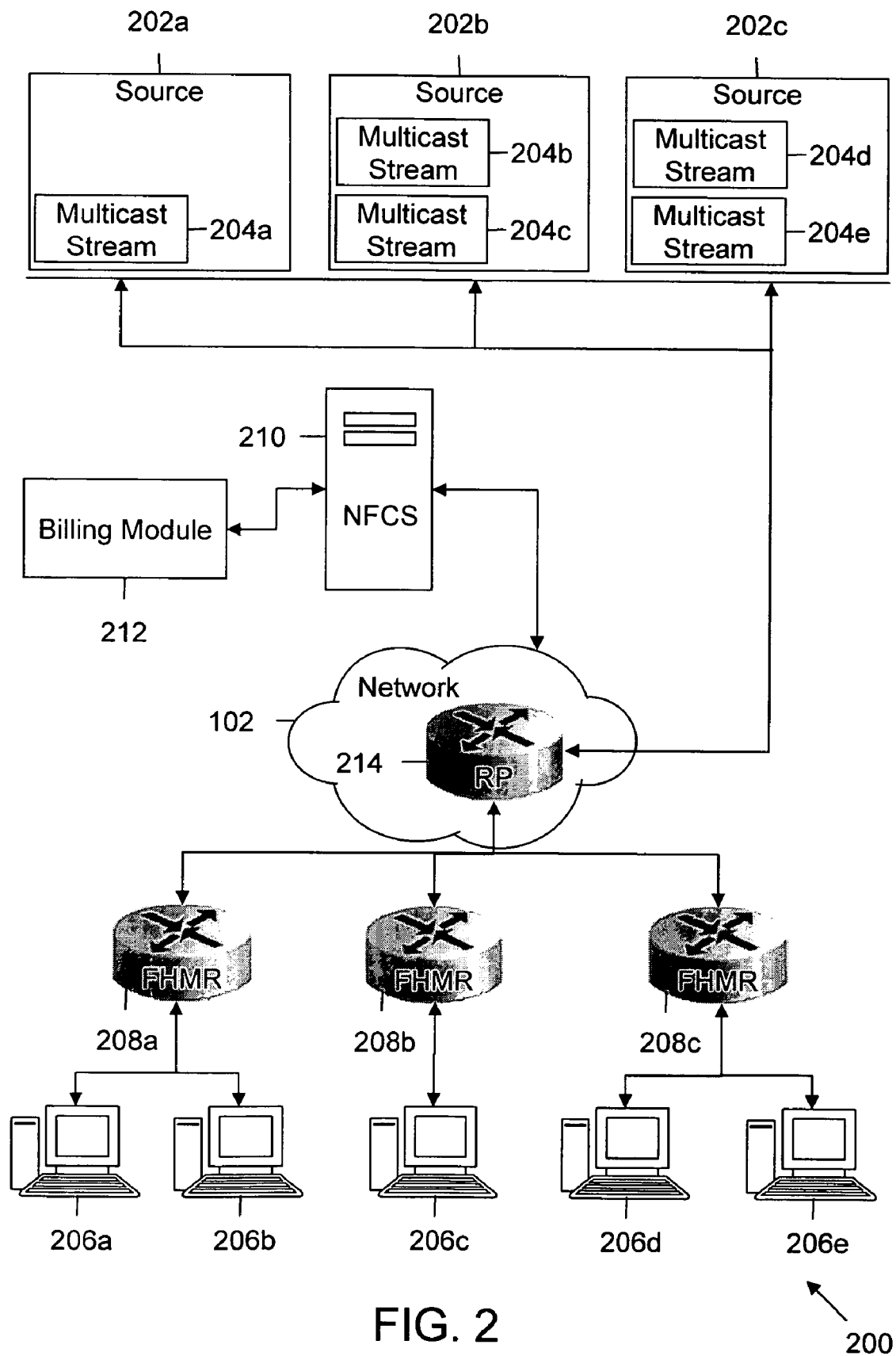
FIG. 2 illustrates various elements of a system for billing network usage in a network, in accordance with an embodiment of the present invention.

FIG. 2 illustrates various elements of system 200 for billing network usage in network 102, in accordance with an embodiment of the present invention. System 200 includes a plurality of sources designated as sources 202, a plurality of multicast streams provided by sources 202 designated as multicast streams 204, a plurality of subscribers designated as subscribers 206, and network 102. Sources 202 transmit multicast streams 204 to subscribers 206 across network 102. Sources 202 can provide one or more multicast streams.

System 200 can be implemented as a part of an organization, where a main office of the organization acts as a source and provides a number of multicast streams to other offices and various departments in the organization, which act as subscribers. The main office, the other offices and the departments in the organization may be located at geographically separated areas and may be connected through a WAN. In such a case, system 200 enables the main office to charge the other offices and the departments appropriately for multicast streams provided to them. Subscribers 206 are billed on the basis of their usage in a similar way.

Further, system 200 includes a plurality of 'First Hop Multicast Routers' (FHMRs) associated with subscribers 206 designated as FHMRs 208. An FHMR is a network infrastructure device in network 102 that is one hop away from a subscriber. Therefore, the subscriber communicates with other network infrastructure devices in network 102 through the FHMR. Examples of network infrastructure devices include, but are not limited to, routers, switches, hubs, gateways, repeaters, and bridges. The FHMR receives a multicast stream subscribed to by the subscriber and transmits it to the subscriber.

For receiving a particular multicast stream, the subscriber transmits an Internet Group Management Protocol (IGMP) join message to the FHMR. Further, it should be noted that an FHMR from FHMRs 208 is not limited to be associated only with a specific number of subscribers. For example, a single FHMR can be associated with a plurality of subscribers present in a LAN.

In accordance with an embodiment of the present invention, network 102 is a multicast network running Protocol Independent Multicast Sparse Mode (PIM-SM). PIM-SM is a protocol that is suitable for providing multicast distribution of data over a network, where only a small percentage of subscribers and their routers subscribe to multicast groups. As mentioned before, subscribers 206 can subscribe to multicast streams 204 provided by sources 202. For example, subscriber 206a can subscribe to any multicast stream from multicast streams 204. For subscription to a particular multicast stream, subscriber 206a transmits an IGMP join message to FHMR 208a. Similarly, subscribers 206b, 206c, 206d and 206e can subscribe to any multicast stream from multicast streams 204. Once FHMR 208a receives the IGMP join message, it transmits a Protocol Independent Multicast (PIM) join message to Rendezvous Point (RP) 214 in network 102. RP 214 is a router in network 102, where PIM join messages from FHMRs 208 for joining sources 202 are received. In an embodiment of the present invention, there are different RPs for different multicast groups in network 102. Further, RP 214 transmits the PIM join messages to sources 202. The PIM join messages can also be directly transmitted by FHMRs 208 to sources 202, through certain shortest paths that include several routers lying in the path from FHMRs 208 to sources 202, but do not include RP 214. Based on the PIM join messages received, multicast distribution trees are formed. The multicast distribution tree includes paths from the source to the subscribers, and is used to multicast the multicast stream. A multicast distribution tree can be a shared distribution tree or a source-based distribution tree. A shared distribution tree is a multicast distribution tree, which shares its root, RP 214, with other multicast distribution trees in network 102. A source-based distribution tree is a multicast distribution tree of a multicast stream, whose root is the source of the multicast stream.

After a multicast distribution tree for a multicast stream is formed, the source of the multicast stream transmits an instance of the multicast stream to RP 214. Thereafter, the instance of the multicast stream is transmitted to the subscribers of the multicast stream such that a copy of the instance is created when the branches of the multicast distribution tree split.

Each FHMR from FHMRs 208 is configured to monitor network usage of each subscriber associated with it. For example, subscriber 206a switches from multicast stream 204a to multicast stream 204b. Subsequently, FHMR 208a performs the control packet processing and there is a change in the multicast distribution trees of multicast streams 204a and 204b. At this time, FHMR 208a monitors the network usage of subscriber 206a. In this way, FHMRs 208 monitor network usage of each subscriber associated with them and transmit statistics of network usage to Net Flow Collection Server (NFCS) 210 included in system 200. This is hereinafter referred as 'push model' for transmitting the statistics to NFCS 210. A system administrator can pre-configure the address of NFCS 210 to which the statistics are to be pushed in the push model. Subsequently, the push model process on FHMRs 208 pushes the statistics to NFCS 210 configured upon the push model.

In an embodiment of the present invention, a network protocol such as Netflow is used for collecting the statistics. Netflow is a protocol that is used to determine flow of data packets in network 102. The protocol includes information about network traffic. Examples of such information include, but are not limited to, timestamps for the start and finish time of a data packet, the number of bytes in the data packet, source IP addresses, destination IP addresses, source port numbers, destination port numbers, etc. The start and finish timestamps provide the duration for which subscribers 206 are subscribed to multicast streams 204. Moreover, the addresses of subscribers 206 are included in the information transmitted to NFCS 210. This statistical information may also herein be referred to as 'netflow information'.

In an embodiment of the present invention, the statistics are obtained at NFCS 210 by polling FHMRs 208 in which NFCS 210 requests each FHMR from FHMRs 208 to provide the statistics. This model of polling FHMRs 208 is hereinafter referred as 'pull model' for receiving the statistics. The system administrator can pre-configure the address of FHMRs 208 from which the statistics are to be pulled in the pull model. Subsequently, the pull model process on NFCS 210 polls FHMRs 208 configured upon the pull model for the statistics.

In accordance with an embodiment of the present invention, the periodicity of transmitting the statistics from FHMRs 208 to NFCS 210 is configured by the system administrator. If the periodicity is low as compared to the frequent switching of subscriptions by subscribers 206, it can lead to loss of accurate information on the joining and leaving of subscribers 206. In case of the push model, the system administrator performs the configuration at FHMRs 208, which then periodically pushes the information to the NFCS. In case of the pull model, the system administrator performs the configuration at NFCS 210.

After receiving the statistics from FHMRs 208, NFCS 210 consolidates the statistics received from each FHMR into a consolidated report. For example, the individual statistics provided by FHMR 208a can be represented as follows:

| Subscriber | Multicast Streams | Start time | End time |
|---|---|---|---|
| 206a | 204a | 9:30:50 | 9:31:19 |
| 206a | 204b | 9:31:20 | 9:33:00 |
| 206b | 204b | 9:35:00 | 9:36:46 |

The individual statistics provided by FHMR 208b can be represented as follows:

| Subscriber | Multicast Streams | Start time | End time |
|---|---|---|---|
| 206c | 204b | 9:33:45 | 9:35:49 |

The individual statistics provided by FHMR 208c can be represented as follows:

| Subscriber | Multicast Streams | Start time | End time |
|---|---|---|---|
| 206d | 204a | 9:31:50 | 9:32:10 |
| 206d | 204b | 9:32:11 | 9:33:00 |
| 206e | 204b | 9:32:01 | 9:33:15 |

Then, the consolidated report prepared by NFCS 210 can be represented as follows:

| Subscriber | Multicast Streams | Start time | End time |
|---|---|---|---|
| 206a | 204a | 9:30:50 | 9:31:19 |
| 206a | 204b | 9:31:20 | 9:33:00 |
| 206b | 204b | 9:35:00 | 9:36:46 |
| 206c | 204b | 9:33:45 | 9:35:49 |
| 206d | 204a | 9:31:50 | 9:32:10 |
| 206d | 204b | 9:32:11 | 9:33:00 |
| 206e | 204b | 9:32:01 | 9:33:15 |

As shown in the consolidated report, NFCS 210 tracks the duration of the subscription of multicast streams 204 by subscribers 206. The tracked information is stored in a log maintained at NFCS 210. This information can be used to determine interests of subscribers 206 in a particular multicast stream. Considering the previous example, NFCS 210 determines that multicast stream 204b had been most popular across subscribers 206a, 206b, 206c, 206d, and 206e. In this way, NFCS 210 determines network-usage patterns of subscribers 206.

Based on the consolidated report prepared by NFCS 210, Billing Module (BM) 212 included in system 200 generates billing information of subscribers 206. In accordance with an embodiment of the present invention, BM 212 can be a software application running on NFCS 210. In accordance with another embodiment of the present invention, BM 212 is a software application running on a processing device connected to NFCS 210. In such a case, NFCS 210 transmits the consolidated report to BM 212.

BM 212 generates the billing information on the basis of certain differential policies configured on it. In this way, subscribers 206 are charged based on their individual usage and the configured policies. Details regarding the policies configured on BM 212 have been provided with reference to FIG. 5.

It is to be understood that the specific designation of sources 202, multicast streams 204, subscribers 206, and FHMRs 208 is for the convenience of the reader and is not to be construed as limiting system 200 to a specific number of sources 202, multicast streams 204, subscribers 206, and FHMRs 208 or to specific types of sources 202, multicast streams 204, subscribers 206, and FHMRs 208 present in system 200.

Figure 3:
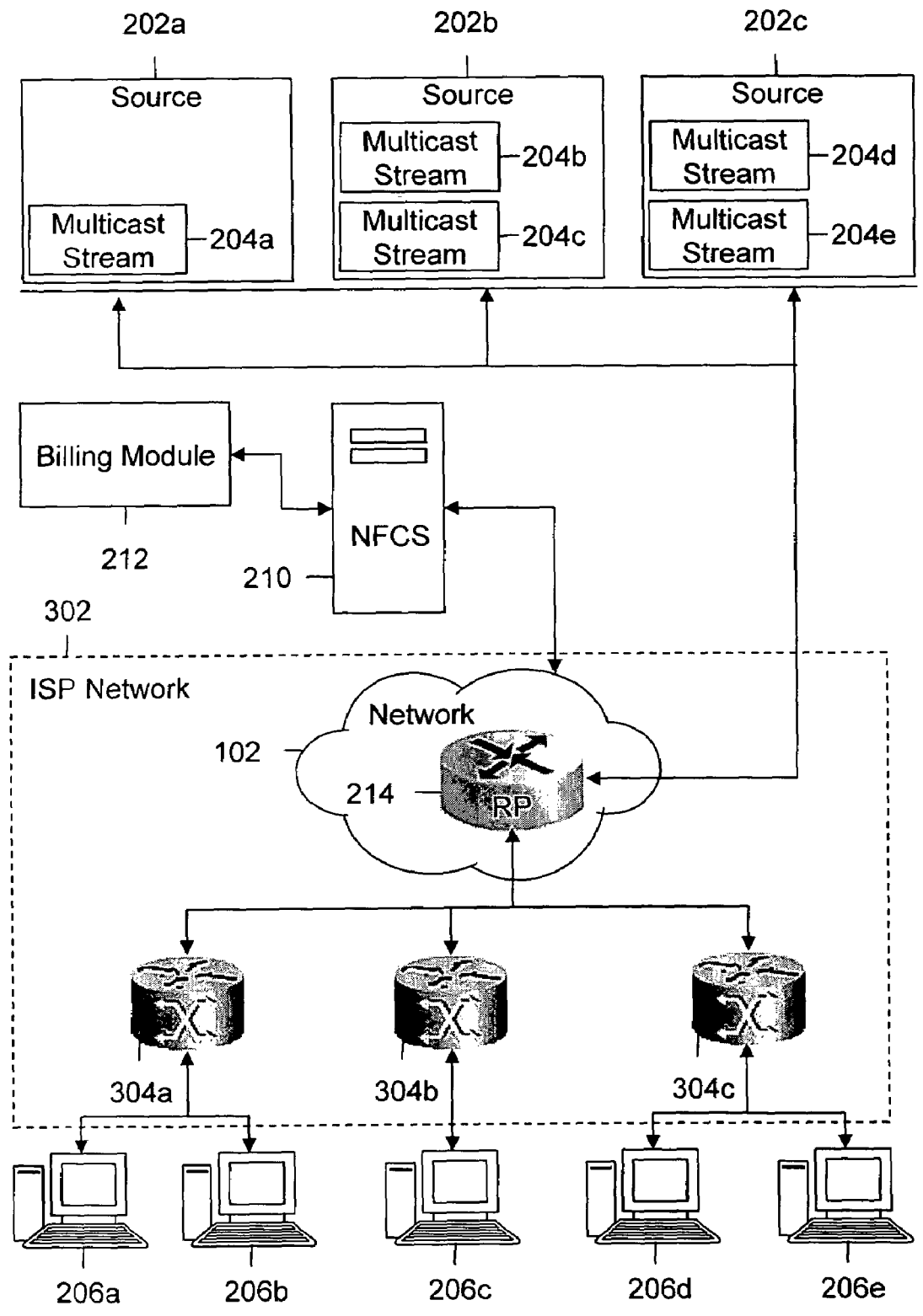
FIG. 3 illustrates various elements of a system for billing network usage in a network, in accordance with another embodiment of the present invention.

FIG. 3 illustrates various elements of system 300 for billing network usage in network 102, in accordance with another embodiment of the present invention. System 300 includes network 102, sources 202, multicast streams 204, subscribers 206, NFCS 210 and BM 212. Further, system 300 includes ISP network 302, which includes network 102 along with a plurality of Provider Edges (PEs) designated as PEs 304. Provider edges are network infrastructure devices, such as routers, for receiving and forwarding data in a network. In an embodiment of the present invention, PEs 304 perform the same operations as FHMRs 208. ISP network 302 provides a communication medium between sources 202 and subscribers 206, which is based on the Internet Protocol (IP). PEs 304 are devices located at the edge of ISP network 302, which interface with subscribers 206. Examples of such devices include, but are not limited to, routers and switches. In accordance with an embodiment of the present invention, an FHMR can be implemented instead of a PE. Various connections between the various elements of system 300 are explained above in conjunction with FIG. 2.

Each PE from PEs 304 is configured to monitor traffic flow in ISP 302, and transmits statistics of network usage of each subscriber associated with it to NFCS 210. In an embodiment of the present invention, NFCS 210 polls PEs 304 for the statistics.

After receiving the statistics from PEs 304, NFCS 210 consolidates the individual statistics received from each PE into a consolidated report. Thereafter, BM 212 generates billing information on the basis of certain policies configured on BM 212.

System 300 can be implemented as a part of an ISP network, where a large number of sources provide various multicast streaming services to a large number of subscribers. These sources can be spread across a large geographical area and can be served by different ISPs. With reference to FIG. 3, ISP network 302 includes an ISP providing Internet services to subscribers 206. System 300 enables this ISP to charge subscribers 206 based on their usage.

In accordance with an embodiment of the present invention, system 300 is implemented as a part of ISP networks. For example, there are two ISP networks, namely, ISP and ISP2. The ISP1 and ISP2 are connected to the subscribers 206 by PEs 304. In this case, there is an NFCS and BM each for ISP1 and ISP2. The subscribers of ISP1 will be charged by its NFCS and BM for the multicast streams provided in ISP1. Similarly, the subscribers of ISP2 will be charged by its NFCS and BM for the multicast streams provided in ISP2.

It is to be understood that the specific designation of PEs 304 is for the convenience of the reader and is not to be construed as limiting system 300 to a specific number of PEs 304 or to specific types of PEs 304 present in system 300.

Figure 4:
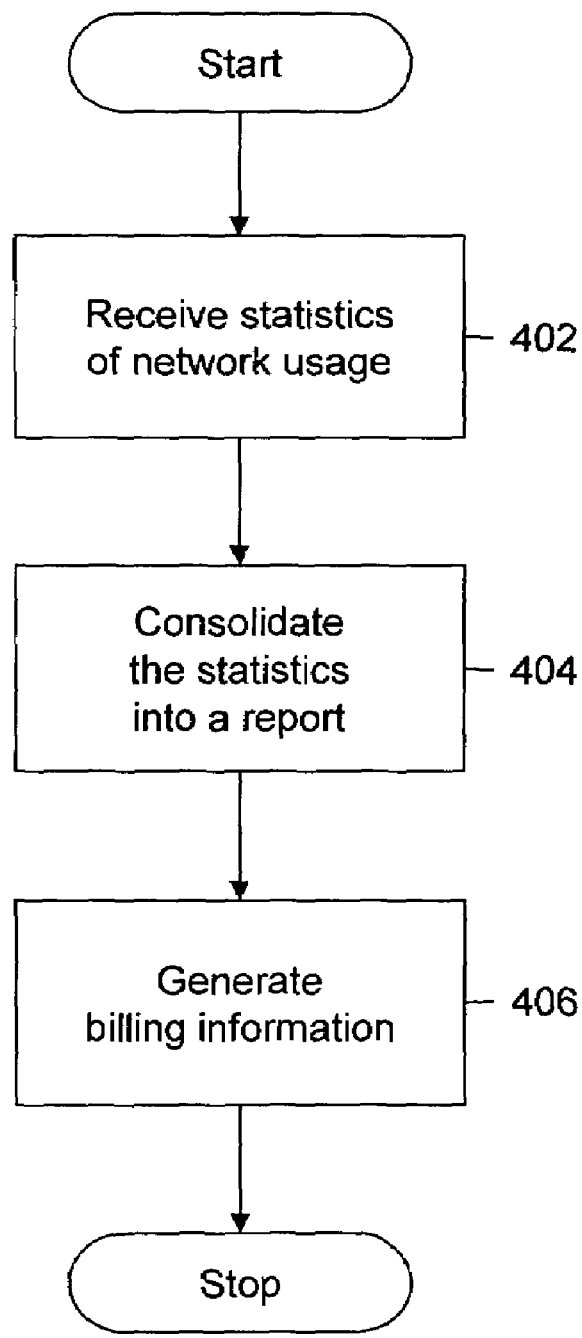
FIG. 4 illustrates a flowchart of a method for billing network usage in a network, in accordance with an embodiment of the present invention.

FIG. 4 illustrates a flowchart of a method for billing network usage in network 102, in accordance with an embodiment of the present invention. At 402, NFCS 210 receives the statistics of network usage of subscribers 206. In accordance with an embodiment of the present invention, NFCS 210 receives these statistics from FHMRs 208. In accordance with another embodiment of the present invention, NFCS 210 receives these statistics from PEs 304. As explained above, the periodicity of transmitting the statistics from FHMRs 208 to NFCS 210 is configured by the system administrator. In case of the push model, FHMRs 208 are configured to push the statistics to NFCS 210. In case of the pull model, NFCS 210 is configured to poll FHMRs 208 and pull the statistics from them.

Thereafter, at 404, NFCS 210 consolidates the individual statistics into a consolidated report. Subsequently, at 406, BM 212 generates the billing information of subscribers 206, based on the consolidated report. The billing information is generated on the basis of the policies configured on BM 212. Details related to these policies have been described in conjunction with FIGS. 6a and 6b.

Figure 5:
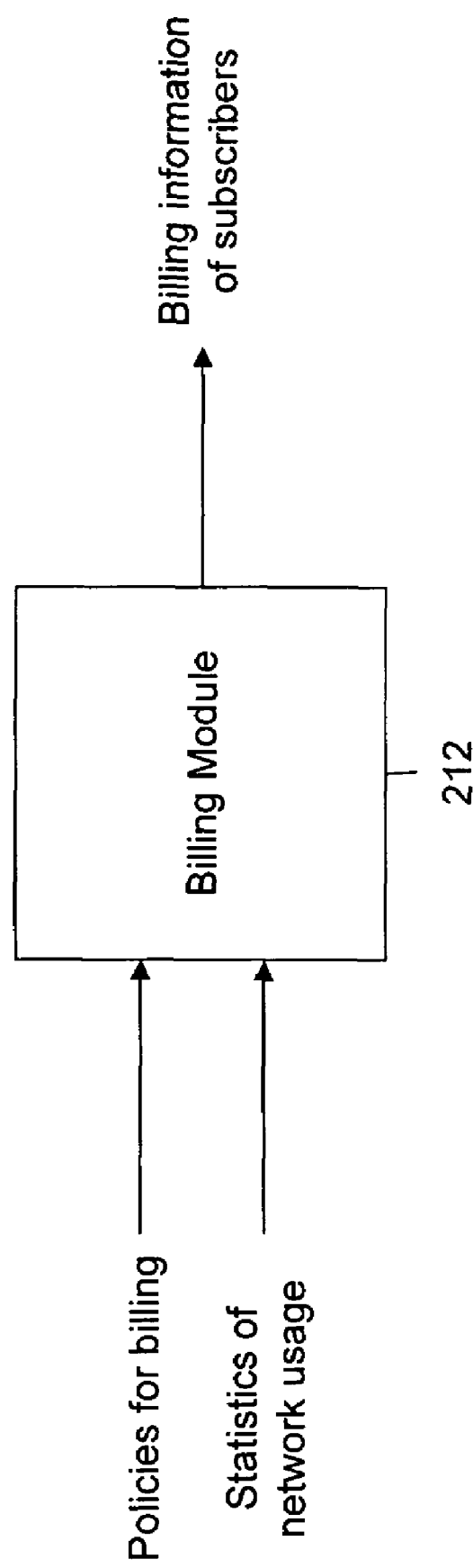
FIG. 5 illustrates a billing module, in accordance with an embodiment of the present invention.

FIG. 5 illustrates BM 212, in accordance with an embodiment of the present invention. The statistics of network usage are provided as an input to BM 212 from NFCS 210. Further, policies are configured on BM 212 for generating the billing information. The policies are configured by the system administrator, in one embodiment, while in another embodiment, a set of policy modules provide a wide choice of policies that may be selectively configured.

In accordance with an embodiment of the present invention, the policies include charging a subscriber a premium amount, if the number of multicast streams switched by the subscriber within a predefined time window exceeds a predefined stream number. In accordance with an embodiment of the present invention, the predefined time window and the predefined stream number are configured by the system administrator. In accordance with another embodiment of the present invention, the predefined time window and the predefined stream number are configured automatically by NFCS 210, based on the netflow information.

Consider, for example, that there are 20 multicast streams available in network 102. The predefined stream number is configured as 15 and the predefined time window is configured as 10 minutes. If subscriber 206a switches 18 multicast streams within 10 minutes, it is charged a premium amount in addition to a base amount of charge. If subscriber 206d switches 5 multicast streams within 10 minutes, it is charged the base amount only. The base amount can be configured by a service provider of network 102. The premium amount can be charged for each multicast stream. Alternatively, the premium amount can be a fixed amount.

In accordance with an embodiment of the present invention, BM 212 identifies one or more default multicast streams for which subscribers 206 are not charged the premium amount. In one case, a default multicast stream is a multicast stream that requires network bandwidth, which is less than a predefined bandwidth threshold. The default multicast stream can be a multicast stream from a set of multicast streams already being multicast through FHMRs 208. Continuing from the above example, if 5 out of 18 multicast streams that are switched are default multicast streams, subscriber 206a is not charged the premium amount for these 5 multicast streams.

In accordance with an embodiment of the present invention, the policies include charging a subscriber a premium amount, if the subscriber subscribes to a premium multicast stream. In one case, a premium multicast stream is a multicast stream that requires network bandwidth greater than the predefined bandwidth threshold. In accordance with an embodiment of the present invention, the predefined bandwidth threshold is configured by the system administrator. In accordance with another embodiment of the present invention, the predefined bandwidth threshold is configured automatically by NFCS 210, based on the netflow information. It should be noted that the predefined bandwidth threshold can be different for default and premium multicast streams.

In another case, a premium multicast stream is a multicast streams that requires an encoding rate greater than a predefined encoding-rate threshold. Encoding rate relates to the quality of content provided in a multicast stream. Higher the encoding rate, higher the quality. In accordance with an embodiment of the present invention, the predefined encoding-rate threshold is configured by the system administrator. In accordance with another embodiment of the present invention, the predefined encoding-rate threshold is configured automatically by NFCS 210, based on the netflow information.

In another case, a premium multicast stream is a multicast stream that offers more types of content than a predefined content threshold. For example, a premium multicast stream, multicast stream A, offers six different audio content and two different video content at the same time. If the predefined content threshold is 5 and subscriber 206b subscribes to multicast stream A that offers 8 different types of content, subscriber 206b will be charged a premium amount for receiving multicast stream A. In accordance with an embodiment of the present invention, the predefined content threshold is configured by the system administrator. In accordance with another embodiment of the present invention, the predefined content threshold is automatically configured by NFCS 210, based on the netflow information.

In accordance with an embodiment of the present invention, the policies include issuing a discount on charges of a premium multicast stream, if more than a predefined number of subscribers subscribe to the premium multicast stream. In accordance with an embodiment of the present invention, the system administrator may configure the predefined number of subscribers. The system administrator may also configure the discount, if any. In accordance with another embodiment of the present invention, NFCS 210 automatically configures the predefined number of subscribers based on the netflow information.

The discount can be issued when the predefined number of subscribers have subscribed to the premium multicast stream at a particular time. The discount can be issued to a predefined number of subscribers associated with a sub-tree. A sub-tree in the multicast distribution tree can be a sub-tree with an FHMR from FHMRs 208 as the root of the sub-tree. Alternatively, the sub-tree can be a sub-tree whose sub-root is a network infrastructure device from network 102, where a plurality of FHMRs are associated with the network infrastructure device. In accordance with an embodiment of the present invention, the sub-tree is a composite tree that is used for streaming various multicast streams within the sub-tree.

Consider, for example, that subscribers 206a, 206b and 206c are included in the same sub-tree and subscribe to a premium multicast stream, multicast stream B. The charge of multicast stream B is $4 per hour. The discount to be issued is configured as 25%. If the predefined number of subscribers is configured as 3, subscribers 206a, 206b and 206c are issued a discount for receiving multicast stream B, and thereby, charged $3 per hour.

Further, it is possible to implement the discount policy on subscribers 206 that are proximal to each other. The proximity of their location may be identified by analyzing the IP addresses of subscribers 206.

Figure 6A:
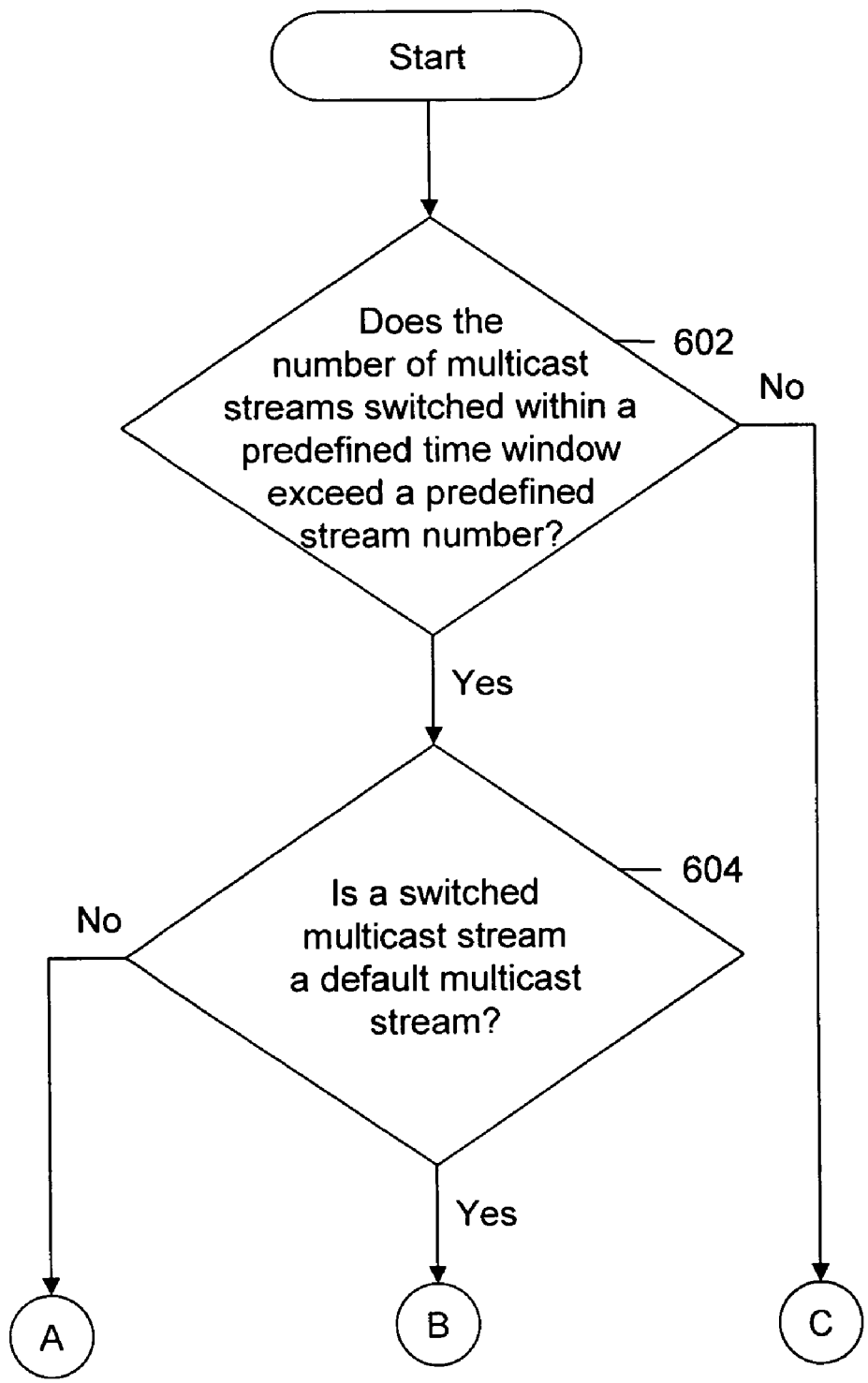
FIGS. 6*a* and 6*b* illustrate a flowchart of a method for generating billing information, in accordance with an embodiment of the present invention.
Figure 6B:
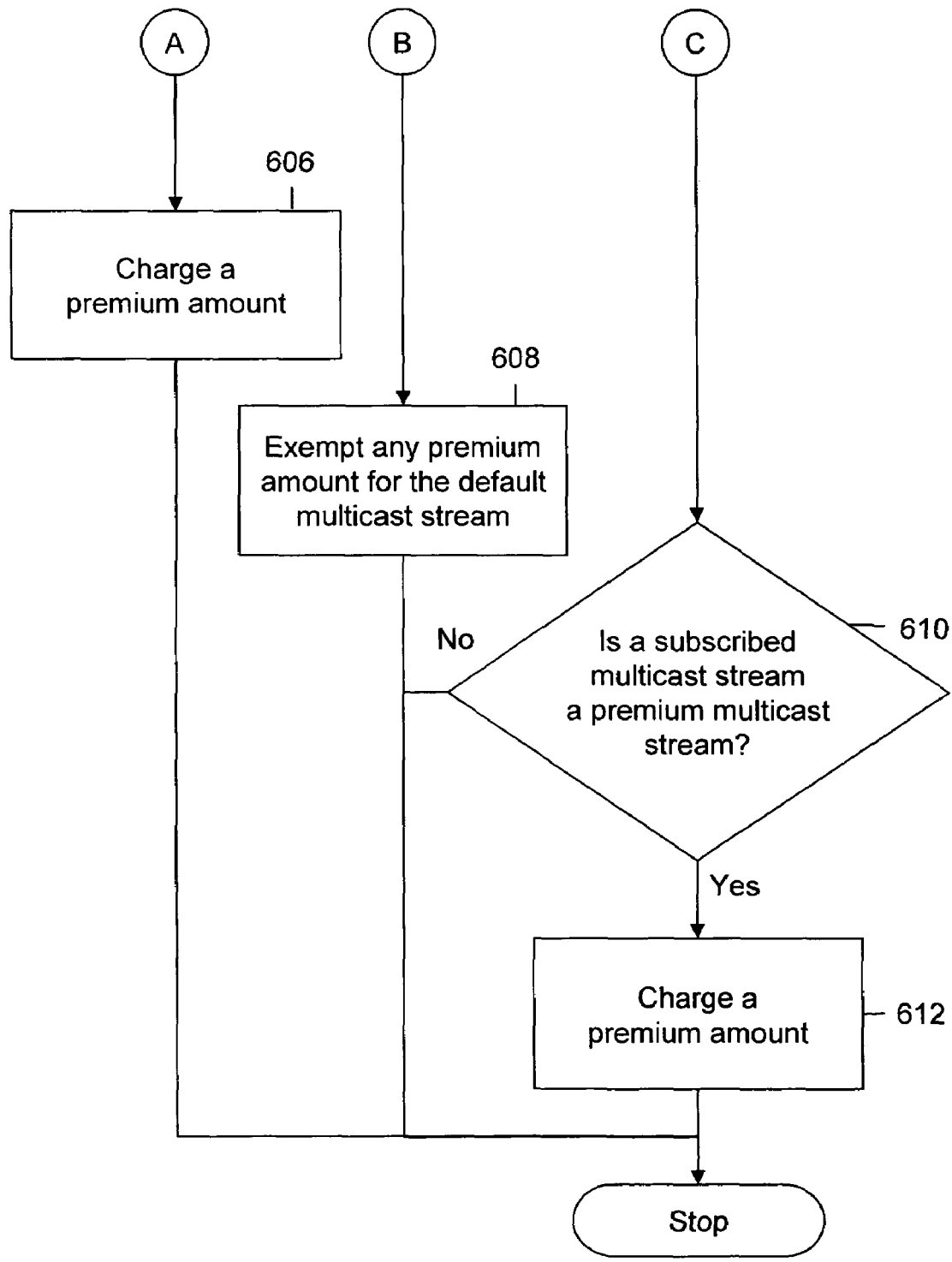

FIGS. 6a and 6b illustrate a flowchart of a method for generating the billing information, in accordance with an embodiment of the present invention. At 602, BM 212 checks if the number of multicast streams switched by a subscriber within the predefined time window exceeds the predefined stream number. If the number of multicast streams switched by the subscriber within the predefined time window exceeds the predefined stream number, 604 is performed.

At 604, BM 212 checks if a multicast stream to which the subscriber has switched is a default multicast stream. If the multicast stream is a default multicast stream, 608 is performed. Consequently, at 608, BM 212 exempts any premium amount for the default multicast stream. However, at 604, if it is found that the multicast stream is not a default multicast stream, 606 is performed. Consequently, at 606, BM 212 charges the subscriber a premium amount.

If, at 602, it is found that the number of multicast streams switched by the subscriber within the predefined time window does not exceed the predefined stream number, 610 is performed. At 610, BM 212 checks if a multicast stream to which the subscriber has subscribed is a premium multicast stream.

If it is found that the multicast stream is a premium multicast stream, 612 is performed. Consequently, at 612, BM 212 charges the subscriber a premium amount. In accordance with an embodiment of the present invention, BM 212 performs 602-612 for each subscriber from subscribers 206.

Further, BM 212 can check if the predefined number of subscribers have subscribed to a particular multicast stream. Accordingly, BM 212 issues a discount to the subscribers on the charges of the premium multicast stream.

In accordance with an embodiment of the present invention, a system for billing network usage in a multicast network includes a BM. The BM includes means for generating the billing information of a plurality of subscribers, based on one or more policies and statistics regarding network usage of each subscriber from the plurality of subscribers. Further, the system includes an NFCS. The NFCS includes means for receiving the statistics regarding network usage of each subscriber from the plurality of subscribers. Further, the NFCS includes means for consolidating the received statistics into a consolidated report. Furthermore, the system includes a plurality of routers. Each router from the plurality of routers includes means for monitoring the network usage of one or more subscribers associated with it and means for transmitting information regarding the monitored network usage to the NFCS. Furthermore, the system includes means for determining network-usage patterns of the plurality of subscribers.

According to an embodiment of the present invention, a method for billing network usage in a multicast network is provided. The method comprises receiving statistics from a plurality of routers regarding network usage of each subscriber from a plurality of subscribers associated with each router; consolidating the statistics received from the plurality of routers into a consolidated report; and generating billing information of the plurality of subscribers, based on the consolidated report.

In a typical multicast network, a frequently switching subscriber and a stable subscriber are charged in a similar manner. Moreover, a subscriber receiving a premium multicast stream and another subscriber receiving a default multicast stream are charged in a similar manner. According to an embodiment of the present invention, FHMRs 208 monitor the network usage of subscribers 206. NFCS 210 receives the statistics of network usage from FHMRs 208 and consolidates the individual statistics into a consolidated report. Thereafter, based on the consolidated report, BM 212 generates the billing information of subscribers 206.

In accordance with an embodiment of the present invention, a frequently switching subscriber is charged a premium amount for the network usage. If a particular subscriber switches more number of multicast streams than the predefined stream number within the predefined time window, the subscriber is charged a premium amount in addition to the base amount. This implies that the frequently switching subscriber is charged more when compared to stable subscribers. Further, BM 212 can be configured to exempt any premium amount for default multicast streams.

Subscribers receiving premium multicast streams are charged a premium amount, in accordance with an embodiment of the present invention. The premium amount may be charged according to the subscriber's network. Subscribers can also receive a discount for a premium multicast stream if more than a predefined number of subscribers have subscribed to the premium multicast stream. Moreover, a discount may be issued to subscribers that are located close to each other. In general, the present invention provides the flexibility to adjust the amount charged to each individual subscriber based on statistical and usage information.

In accordance with an embodiment of the present invention, the network-usage patterns of subscribers 206 can be determined. The statistics received by NFCS 210 can be used to determine particular interests of subscribers 206 in multicast streams 204.

Although the present invention has been discussed with respect to specific embodiments thereof, these embodiments are merely illustrative, and not restrictive, of the present invention. For example, a 'method for billing network usage in a multicast network' can include any type of analysis, manual or automatic, to anticipate the needs of obviating redundant actions.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

Any suitable programming language can be used to implement the routines of an embodiment of the present invention including C, C++, Java, assembly language, etc. Different programming techniques can be employed such as procedural or object oriented. The routines can execute on a single processing device or multiple processors. Although the steps, operations or computations may be presented in a specific order, this order may be changed in different embodiments. In some embodiments of the present invention, multiple steps shown as sequential in this specification can be performed at the same time. The sequence of operations described herein can be interrupted, suspended, or otherwise controlled by another process. The routines can operate in a networking environment or as stand-alone routines occupying all, or a substantial part, of the system processing.

In the description herein for the embodiments of the present invention, numerous specific details are provided, such as examples of elements and/or methods, to provide a thorough understanding of the embodiments of the present invention. One skilled in the relevant art will recognize, however, that an embodiment of the present invention can be practiced without one or more of the specific details, or with other apparatus, systems, assemblies, methods, components, parts, and/or the like. In other instances, well-known operations are not specifically shown or described in detail to avoid obscuring aspects of the embodiments of the present invention.

A 'computer program' for purposes of the embodiments of the present invention may include any processor-containing device, such as a mainframe computer, personal computer, laptop, notebook, microcomputer, server, personal data manager (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a pre-determined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of the embodiments of the present invention may be any medium that can contain and store the computer program for use by or in connection with the instruction execution system apparatus, system or device. The computer readable medium can be, by way of example only but not by limitation, a semiconductor system, apparatus, system, device, or computer memory.

Reference throughout this specification to "one embodiment", "an embodiment", or "a specific embodiment" means that a particular feature, structure, or characteristic described in connection with the embodiment is included in at least one embodiment of an embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the present invention to the precise forms disclosed herein. While specific embodiments of, and examples for, the present invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of the embodiments of the present invention will be employed without a corresponding use of other features without departing from the scope and spirit of the present invention as set forth. Therefore, many modifications may be made to adapt a particular situation or material to the essential scope and spirit of the present invention. It is intended that the present invention not be limited to the particular terms used in following claims and/or to the particular embodiment disclosed as the best mode contemplated for carrying out this present invention, but that the present invention will include any and all embodiments and equivalents falling within the scope of the appended claims.

What is claimed is:

1. A method for billing network usage in a multicast network, the method comprising:
   receiving statistics from a plurality of routers regarding network usage by each subscriber receiving a multicast stream from a plurality of subscribers associated with each router;
   consolidating the statistics received from the plurality of routers into a report;
   configuring one or more differential policies for generating the billing information; and
   generating billing information for each multicast stream received by each subscriber of the plurality of subscribers based on the report and the one or more policies.

2. The method of claim 1, wherein each router from the plurality of routers is a First Hop Multicast Router (FHMR).

3. The method of claim 1 further comprising determining network-usage patterns of the subscribers.

4. The method of claim 1 further comprising configuring the one or more policies for generating the billing information to charge a subscriber a premium amount, if the number of multicast streams switched by the subscriber within a predefined time window exceeds a predefined stream number.

5. The method of claim 1 further comprising identifying one or more default multicast streams for which a subscriber is not charged a premium amount.

6. The method of claim 1 further comprising:
   identifying one or more premium multicast streams; and
   configuring one or more policies for generating the billing information, the one or more policies comprising charging a subscriber a premium amount, if the subscriber subscribes to a premium multicast stream from the identified premium multicast streams.

7. The method of claim 1 further comprising configuring one or more policies for generating the billing information, the one or more policies comprising issuing a discount on charges of a premium multicast stream, if more than a predefined number of subscribers have subscribed to the premium multicast stream.

8. The method of claim 1, wherein the receiving the statistics comprises pushing the statistics from the plurality of routers to a Net Flow Collection Server (NFCS).

9. The method of claim 1, wherein the receiving the statistics comprises pulling the statistics from the plurality of routers by a Net Flow Collection Server (NFCS).

10. A system for billing network usage in a multicast network, the system comprising:
    a Billing Module (BM), the BM adapted for generating billing information of a plurality of subscribers based on one or more policies and statistics regarding network usage of each subscriber from the plurality of subscribers receiving a multicast stream, the one or more policies comprising charging one subscriber a premium amount if the number of multicast streams switched by the one subscriber from the plurality of subscribers within a predefined time window exceeds a predefined stream number.

11. The system of claim 10 further comprising a Net Flow Collection Server (NFCS), the NFCS comprising:
    means for receiving the statistics regarding network usage of each subscriber from the plurality of subscribers; and
    means for consolidating the received statistics into a report.

12. The system of claim 11 further comprising a plurality of routers, each router from the plurality of routers comprising:
    means for monitoring the network usage of one or more associated subscribers; and
    means for transmitting information regarding the monitored network usage to the NFCS.

13. The system of claim 12, wherein each router from the plurality of routers is a First Hop Multicast Router (FHMR).

14. The system of claim 11, wherein the NFCS further comprises means for determining network-usage patterns of the plurality of subscribers.

15. The system of claim 10, wherein the statistics comprise information about traffic flow.

16. The system of claim 10, wherein the one or more policies comprise charging a subscriber a premium amount, if the number of multicast streams switched by the subscriber within the predefined time window exceeds the predefined stream number.

17. The system of claim 10, wherein the one or more policies comprise charging a subscriber a premium amount, if the subscriber subscribes to a premium multicast stream.

18. The system of claim 10, wherein the one or more policies comprise issuing a discount on charges of a premium multicast stream, if more than a predefined number of subscribers have subscribed to the premium multicast stream.

19. A computer-readable storage medium including instructions executable by a processor for billing network usage in a multicast network, the machine-readable medium comprising:

one or more instructions for charging a subscriber a premium amount, if the number of multicast streams switched by the subscriber within a predefined time window exceeds a predefined stream number; and one or more instructions for charging the subscriber a premium amount, if the subscriber subscribes to a premium multicast stream.

20. The computer-readable storage medium of claim 19 further comprising one or more instructions for issuing a discount on premium multicast stream charges if the number of subscribers receiving the premium multicast stream exceeds a predefined number.

21. The computer-readable storage medium of claim 19 further comprising one or more instructions for configuring one or more policies for generating the billing information.

22. The computer-readable storage medium of claim 19 further comprising one or more instructions for identifying one or more default multicast streams for which a subscriber is not charged a premium amount.

* * * * *